United States Patent [19]
Chandler

[11] 3,944,972
[45] Mar. 16, 1976

[54] COMMUNICATION DEVICE FOR ASSISTING THE DRIVER OF A VEHICLE

[75] Inventor: Roy L. Chandler, 4115 Shady Valley Drive, Arlington, Tex. 76013

[73] Assignee: Geno Corporation, Arlington, Tex.

[22] Filed: Jan. 19, 1973

[21] Appl. No.: 325,206

[52] U.S. Cl. .................................... 340/74; 340/286
[51] Int. Cl. .......................... B60q 1/26; G08b 5/38
[58] Field of Search ............ 340/51, 52 R, 74, 81 R, 340/286, 332, 87

[56] References Cited
UNITED STATES PATENTS

| | | | |
|---|---|---|---|
| 1,269,246 | 6/1918 | Pocoroba | 340/87 |
| 1,716,370 | 6/1929 | Dark et al. | 340/80 |
| 3,021,513 | 2/1962 | Lankey | 340/286 T |
| 3,046,521 | 7/1962 | Cantwell et al. | 340/74 UX |

OTHER PUBLICATIONS

Popular Science Jan. 1934 Issue p. 21 *Signal Lights Help Hoist Girders.*

*Primary Examiner*—Donald J. Yusko
*Attorney, Agent, or Firm*—Charles W. McHugh

[57] ABSTRACT

A communications device to foster the correct steering of a vehicle by a driver who cannot see where the vehicle is moving with respect to its surroundings, including a control box which is handled by a remote observer, and an indicator panel having at least three lights thereon, with the control box and the indicator panel being connected by appropriate electrical conductors. The control box has one or more switches which generate nine basic signals to indicate to the vehicle driver what he should do, including such signals as turn his steering wheel to the left or to the right, or that he should either move forward, backward or stop the vehicle. The preferred embodiment includes a single control knob on the control box which is moved by the observer in the direction that the vehicle should move. The signal knob is biased to be in a centered position, and movement of the knob either forward or rearward, or to one side or the other, will cause an appropriate signal to be generated which is displayed in front of the driver on his indicator panel. When the device is activated, it has an initial rest position in which the signal displayed in front of the driver is "stop"; all movement instructions from the observer must over-ride the stop signal. Hence, the unit is fail-safe in that any interruption of signals being generated by the observer's control box due to a malfunction will cause a stop signal to appear in front of the vehicle driver. The device can also be used to give instructions to a driver who is attempting to back a vehicle and trailer, by reversing the manner in which the indicator lights are activated.

12 Claims, 10 Drawing Figures

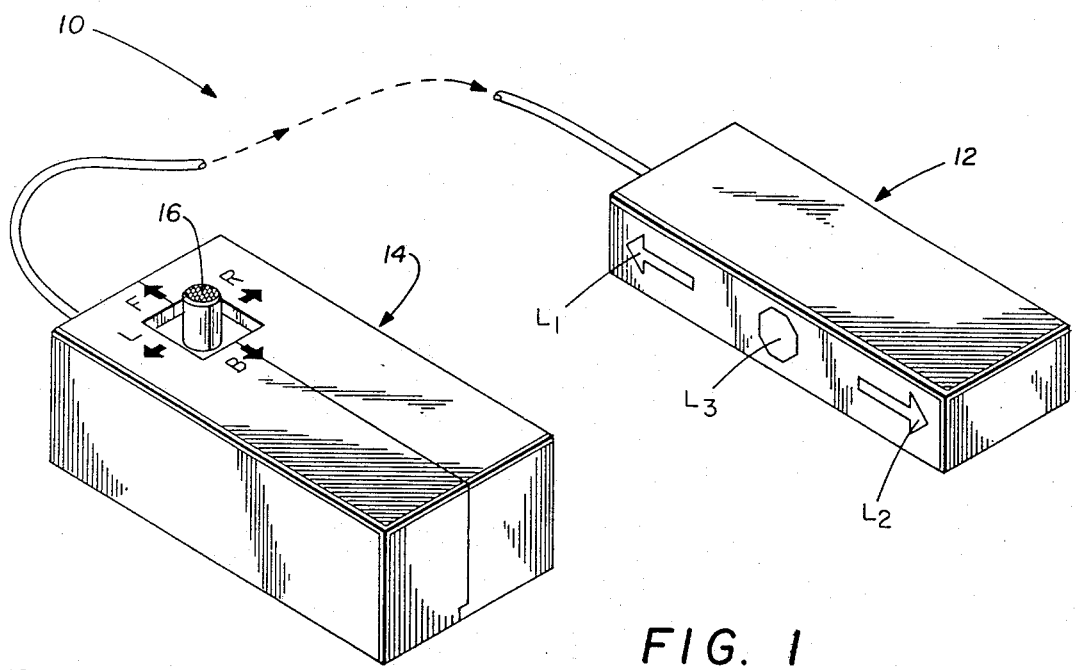
FIG. 1
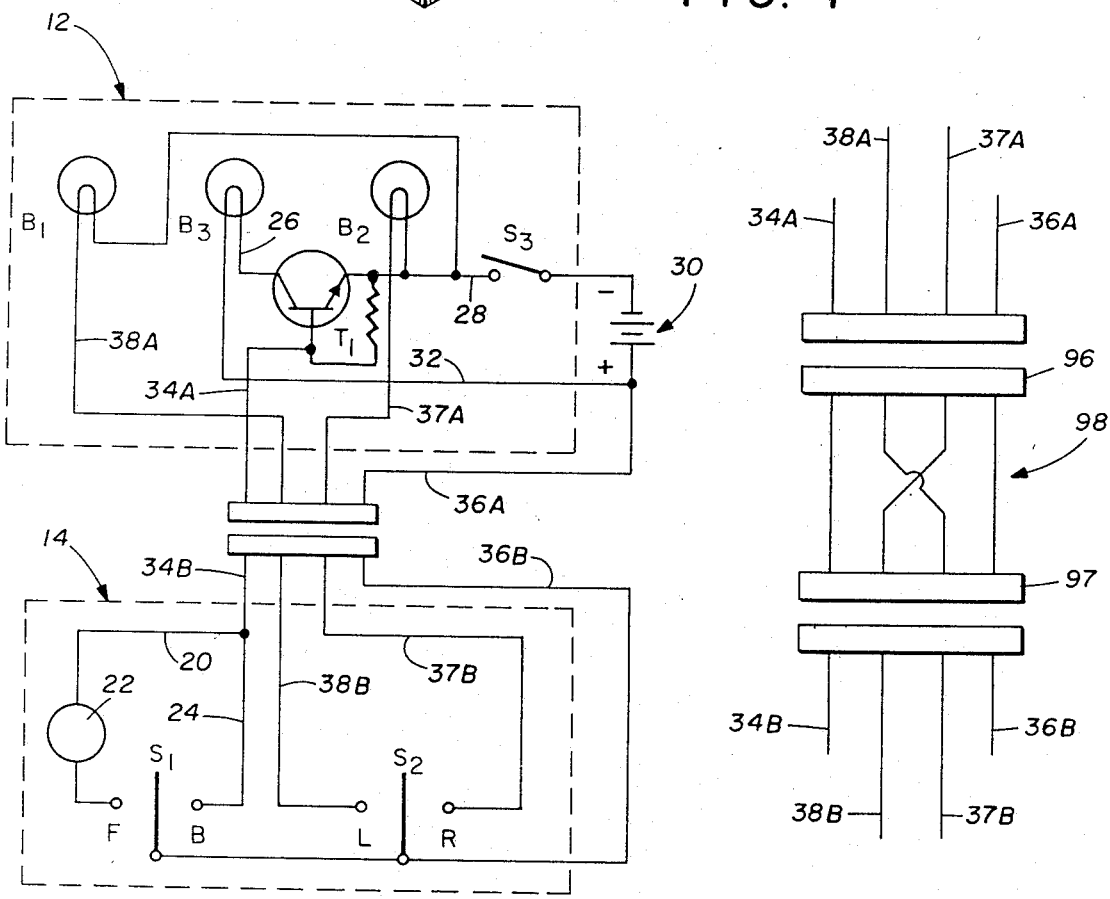
FIG. 2
FIG. 10

| SIGNAL FROM OBSERVER | CONTROL KNOB POSITION | STATE OF INDICATOR BULB $B_3$ |
|---|---|---|
| STOP | RELEASE (TO BREAK CONTACT) | STEADY ON |
| BACK UP | MOVE BACK | LIGHT OFF |
| PULL FORWARD | MOVE FORWARD | FLASHING ON |

| SIGNAL FROM OBSERVER | CONTROL KNOB POSITION | INDICATOR |
|---|---|---|
| TURN RIGHT | PUSH TO RIGHT | RIGHT ARROW |
| TURN LEFT | PUSH TO LEFT | LEFT ARROW |
| HOLD WHEEL POSITION | RELEASE (TO BREAK CONTACT) | NO ARROW |

COMMUNICATION DEVICE FOR ASSISTING THE DRIVER OF A VEHICLE

This invention relates to communication devices, and more particularly to an electrical device which will permit an observer who is some distance away from a vehicle (such as to the rear thereof) to send signals to the driver of the vehicle, so as to give said driver instruction concerning the way that the vehicle should be steered when the vehicle is being moved toward a desired target. Typically, the device may be used by an observer on foot to send instructions to the driver of a backing vehicle when the driver cannot see where his vehicle is going.

There has traditionally been great difficulty when a driver of a front-steered vehicle wished to back his vehicle into a particular area that he could not see when seated. Such a circumstance arises when the driver of a recreational vehicle (e.g., a motor home) or a truck wishes to back his vehicle into a parking place. Another common situation is where the driver of a car wishes to back his car into a position such that a ball on the rear of his car can be connected to the mating socket of a trailer hitch affixed to a trailer. Each of these (and many other) examples are characterized in that the driver cannot usually see where the rear of his vehicle is with respect to his target or any obstacles. When the driver is fortunate enough to have another person with him, the additional person can usually stand at the rear of the vehicle and give some sort of indication to the driver as to his proximity to the target, as well as some information on his orientation with respect to the target. While such an observer at the rear of the vehicle can usually see both the static target and the approaching vehicle, it seems to have been very difficult in the past for the observer to easily communicate what he sees to the driver, so that corrective action in steering (if necessary) can be taken. There is the added difficulty that the observer and driver frequently forget to initially establish firm ground rules on the language they will use, so that when the observer shouts "left", the driver will properly interpret such a shout to mean either "steer to the left," or "the car is headed too far to the left of the trailer," or "the trailer is going to be too far to the left of the car," etc. It would probably not be an exaggeration to suggest that hundreds or even thousand of arguments have been generated over the years as a result of poor communication between various husbands and wives when the husband was attempting to back his vehicle toward a parked trailer and his wife was standing at the rear of the vehicle attempting to give intelligent instructions to him. In fact, those who are experienced in the recreational vehicle industry are easily able to distinguish the novice camper from the veteran merely by listening to how the observer on foot tries to give commands that are useful to the backing driver.

Another difficulty has been that those persons who are adults and should know their right hand from their left have been known sometimes to mistakenly say "right" when they meant left. Also, there are many children who do not have the left-right relationship well settled in their minds, such that they do not know how to issue correct vocal instructions; but even young children are usually capable of seeing whether or not a car is correctly approaching a trailer, and they could give meaningful information to the driver based on spatial relationships—if they only had some way to convey what they see. Accordingly, it is an object of this invention to provide a communications device which does not use spoken language and which should be useful for most any observer to give instructions to the driver of a vehicle as he attempts to move it towards a desired target.

It is another object to provide a fail-safe way of communicating with the driver, so that the driver will not accidently back over his observer or crash into a trailer if something should go wrong with the signal-generating device.

Still another object is to provide a simple system which can convey nine graphic commands to the vehicle driver with only three display elements.

One more object is to provide a momentary-off capability for a basic single pole, double throw slide switch.

A further object is to provide a technique for ganging two single pole, double throw switches 90° apart so that they will provide a centered rest position for an arm between four possible positions on two orthogonal axes.

These and other objects and advantages will be apparent from the specification and claims, and from the accompanying drawing illustrative of the invention.

In the drawing:

FIG. 1 is a perspective view of a device according to the invention, showing a display panel which is seen by the driver and a control box used by a remote observer;

FIG. 2 is a schematic electrical diagram of the device shown in FIG. 1;

FIG. 10 is an illustration of how an extension cord for use with trailers is cross-wired to compensate for the pivotal connection between a vehicle and a trailer.

Figures 3, 4, 5:
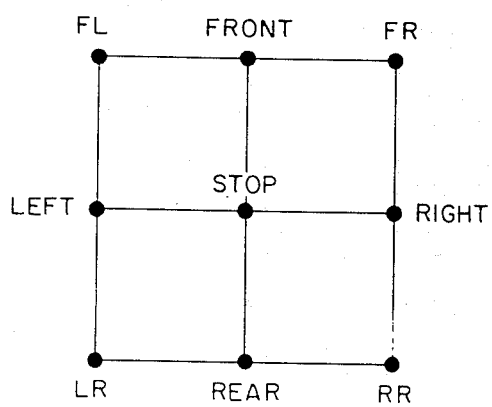
FIG. 3 is an outline of the various movement commands, actions at the control box, and the results which are displayed at the indicator panel.
FIG. 4 is an outline similar to FIG. 3 which is concerned with steering commands.
FIG. 5 is a sketch of the nine positions into which the control knob of FIG. 1 can be put.

With initial reference to FIG. 1, the device 10 of the invention includes an indicator box 12 adapted to be positioned on the vehicle near (and typically in front of) the driver's station or seat. The front panel of the indicator box 12 has at least three display devices, which are preferably lenses $L_1$, $L_2$, $L_3$ mounted in front of lightbulbs $B_1$, $B_2$, and $B_3$. The lenses $L_1$ and $L_2$ are preferably arranged at opposite ends of a longitudinal (and horizontally mounted) indicator panel, such that the vehicle driver sees one light ($L_1$) to his left and the other light ($L_2$) to his right. To facilitate the transmittal of "turning" instructions to the driver, it is preferable that these two lenses be in the shape of arrows; and it is preferable that the arrows be pointed in the direction in which the vehicle driver should turn his steering wheel when a respective light is turned on. Thus, when a "turn" command is generated by the observer, an appropriate lightbulb will be illuminated; and the vehicle driver's senses will not only be stimulated by the light, but also he will be graphically reminded of what he is to do when the light comes on. While it is appropriate that at least one lens be placed on the left of the panel and the other lens be generally to the right, the positioning of the third lens is not so significant; however, a natural location for it is in the center of the indicator box. To clearly distinguish lens $L_3$ from the other lenses, it is preferable that the third lens have its own unique shape, such as the octagon shape which is widely recognized as the shape of stop signs.

The control box 14 is adapted to be held by the observer at a position where he can observe both the vehicle and its surroundings that are of concern, e.g., trees, parked cars, trucks, ditches, stumps, trailers, water faucets, light poles, and other obstacles. The observer will typically be quite remote from the driver; otherwise, voice communications would probably suffice to inform the driver of his position with respect to his target and any adjacent obstacles. Most commonly the observer probably will be at the rear of a backing vehicle and facing the vehicle. The control box 14, which is the means by which signals are generated, will usually be held horizontally in one hand of the observer and oriented the same way the vehicle is oriented. In the preferred embodiment, a single knob 16 projects from the top of the control box 14 in such a way that it can be touched and moved by a finger or thumb of the observer. The knob 16 is biased by springs or the like to a central position on the control box 14. To the right of the control knob 16 is the letter R, or the word "Right," or simply an arrow pointing to the right of the control box; similiarly, the letter L, the word "Left," or an arrow pointing to the left is provided. Also, one end of the control box 14 is designated as the front, and on top of the control box near the front is the letter F, the word "Forward" or another arrow pointing to the front. Similarly, to the rear of the control knob 16 is an appropriate indicator which will convey to the observer that moving the knob in that direction will generate a "drive backward" signal.

Referring next to FIG. 2, a schematic electrical circuit for the device 10 is shown. Within the broken line 14 representing the control box are shown two switches, namely, a movement switch $S_1$ and a steering switch $S_2$. Both the movement switch $S_1$ and the steering switch $S_2$ are preferably low voltage, single pole, double throw (SPDT) slide switches. Such switches are very economical to manufacture because of their simple design, and they are generally quite reliable. According to this invention, they can be installed in such a way as to additionally provide momentary-off action; the momentary-off feature, per se, is not new, of course, but it is a feature which normally is available only in switches costing at least three times as much as basic SPDT slide switches. One terminal of the switch $S_1$ is connected through wire 20 to bulb $B_3$ through a transistor $T_1$. The transistor $T_1$ may be any PNP general purpose power transistor, such as Motorola S 006. Interjected in line 20 is a flasher 22, which can be the same as those installed as original equipment in conjunction with turn signals on modern automobiles. Alternatively, it may be a so-called "flasher bulb" (e.g., GE 406 or 407); solid state flashers could also be used. The flasher 22 is included in the circuit which is to provide a forward signal to the vehicle driver, which will be explained in more detail hereinafter. The other extreme terminal of the movement switch $S_1$ is connected through line 24 to the transistor $T_1$, such that the bulb $B_3$ can be illuminated at an appropriate time.

That part of the circuit which includes the battery and bulb $B_3$ will now be examined in greater detail. The bulb $B_3$ is connected through conductor 26 to the emitter electrode of transistor $T_1$; the collector electrode of the transistor is connected through conductor 28 and on-off switch $S_3$ to the negative terminal of the battery 30. The bulb $B_3$ is connected at all times to the positive terminal of the battery through conductor 32. The base of the transistor $T_1$ is connected through conductor 34 to the movement switch $S_1$. When on-off switch $S_3$ has been turned on to energize the systems, bulb $B_3$ will immediately be illuminated by virtue of current flowing through conductors 32, 26, and 28. This provides an immediate check on the operation of the most significant part of the system-the indicator box that the driver sees. If movement switch $S_1$ should be moved to either of its two extreme terminals, the base of transistor $T_1$ will be biased positively by virtue of current flowing through conductors 36, 34 and either 24 or 20. When this happens, transistor $T_1$ switches off and lightbulb $B_3$ turns off. Thus, bulb $B_3$ will be illuminated only when the actuator of switch $S_1$ is centered between its two extreme positions, so that no current flows through conductors 20 or 24. This corresponds to knob 16 being in its centered position (longitudinally) in the control box 14. The steady burning of bulb $B_3$ is used as the signal to the driver that the vehicle should not be moved or, if moving, that it should be stopped. Naturally, then, when the driver activates his system by turning on-off switch $S_3$ to its "on" position, the first signal he receives is to keep the vehicle motionless. Any affirmative signal from the observer telling the driver to move the vehicle (either forward or backward) must override this built-in bias of the device 10 instructing the driver to keep his vehicle in its safest mode, i.e., stopped.

The observer will normally be standing at the rear of the vehicle with the control box 14 held in the same general orientation that the vehicle has, i.e., the front of the control box will be pointed in the same direction as the front of the vehicle. If the observer wishes to tell the driver to place the vehicle in motion to the rear, he merely pushes the knob 16 to the rear. Moving the knob 16 to the rear also moves the slide of switch $S_1$ to the rear until it makes contact with the rear terminal, thereby biasing transistor $T_1$ positive through conductors 36, 24, and 34; light $B_3$ will then go off. The absence of any illumination behind lens $L_3$ is the prearranged signal to the driver that he should begin to back up. When the observer wishes to halt the rearward movement of the vehicle, he merely releases his force against the knob 16, and it returns to its centered position. With the knob 16 in its centered position, the circuit including conductors 32, 26 and 28 is again closed, and light $B_3$ is again turned on; this indicates to the driver that he should stop. If the observer decides that the vehicle has been moved too far to the rear, he pushes the knob 16 in the direction the vehicle should be moved, i.e., forward, causing the slide of switch $S_1$ to make contact with the forward terminal. This causes the circuit that includes flasher 22 to be effective in intermittently biasing the base of transistor $T_1$ positive. Since the base of transistor $T_1$ is only intermittently positive, the lightbulb $B_3$ correspondingly will be intermittently on; this is the prearranged signal to the driver that he should pull forward. These instructions of "stop," "move backward," and "move forward" are considered to be basic instructions which must be supplied in order to communicate with a driver as he operates his vehicle based only on instruction from a remote observer; they are also illustrated in FIG. 3.

With continued reference to FIGS. 1 and 2, control knob 16 is also connected to steering switch $S_2$. The right terminal of switch $S_2$ is connected through conductor 37 to bulb $B_2$. The left terminal of switch $S_2$ is connected through conductor 38 to bulb $B_1$. Both bulbs $B_1$ and $B_2$ are connected to the battery 30 through conductors 28 and 36. When the observer wishes the moving vehicle to incline to the right, he moves knob 16 to the right, energizing normally off bulb $B_2$. The driver seeing that bulb $B_2$ has been energized will know (because of prearranged instruction) to turn his steering wheel in the direction of the arrow $L_2$ which lies over bulb $B_2$. When sufficient corrective steering has been accomplished, the observer merely releases knob 16 and it returns to its centered position where neither $B_1$ or $B_2$ are illuminated. The driver will know to cease further turning of his steering wheel and to merely hold his present grip on the wheel—until he receives an additional signal from the observer to turn further or to turn back to a straight-ahead position. Similarly, moving knob 16 to the left on the control box will cause the left terminal to be contacted and, through conductors 38, 28, and 36, the bulb $B_1$ will be energized by the battery 30. The various turn signals that can be generated by the observer are shown in FIG. 4. It is also possible to combine the steering signals with the movement signal according to this invention, with the result that the following nine signals can be generated—all without the need for a spoken word: stop, turn steering wheel to right, turn steering wheel to left, move forward while steering right, move forward while steering left, move backward, move backward while steering left, and move backward while steering right. These commands or instructions are graphically displayed in front of the vehicle operator by moving the control arm 16 to an appropriate one of the nine positions shown in FIG. 5.

Figure 6:
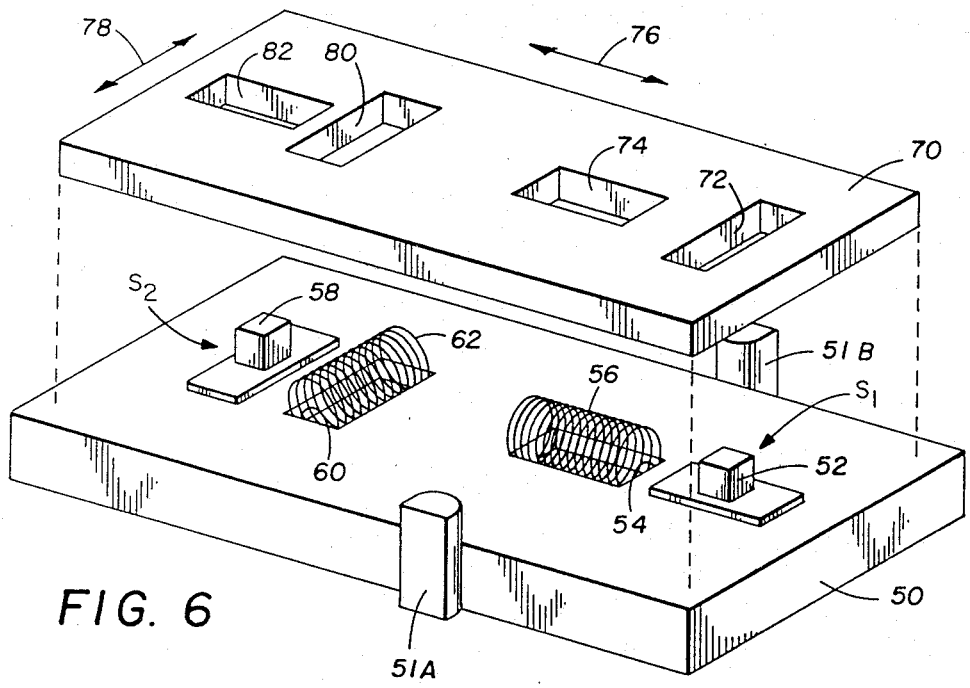
FIG. 6 is a perspective view of a simplified arrangement by which two very basic SPDT switches can be made to give momentary-off service.

Referring now to FIG. 6, the construction that permits only two slide switches to provide the nine command positions of FIG. 5 will now be described. A base 50 has two widely spaced apertures in which are firmly mounted the two slide switches $S_1$, $S_2$. Such switches may be equivalent to Model GF 123 SPDT manufactured by CW Industries of Warminster, Pa. Slide switch $S_1$ is mounted at one end of the base 50 with an orientation such that it is adapted to provide movement instructions for the driver. By use of the word "movement," it is intended to convey the idea of merely placing the vehicle in motion, without regard to the direction it will move with respect to the ground. An arm 52 extends upward from the housing of switch $S_1$, and it is this arm that must be physically moved in order to make contact with either of the two spaced terminals of the SPDT switch.

Another aperture or recess 54 is provided in the base 50, for the purpose of accomodating approximately one-half of a coil spring 56. The other half of the coil spring 56 is accommodated in a recess or aperture 74 in the plate 70. When the plate 70 is juxtaposed over the base 50 in its normal relationship, the arm 52 will extend into recess 72. Movement of plate 70 along an axis represented by arrow 76 will cause the arm 52 to be similarly moved, and the switch $S_1$ will be actuated.

Figure 7:
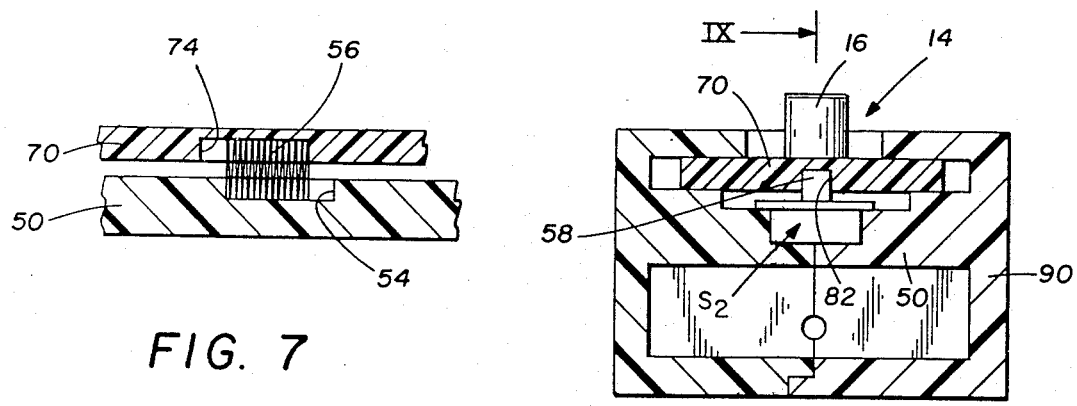
FIG. 7 is a fragmentary view in elevation of the coil spring shown in FIG. 6 as it tends to return the pieces to a centered position.

Upon movement of plate 70 toward the front of the base 50 (as a result of some force being applied thereto), coil spring 56 will be compressed, as shown in FIG. 7. When the external force which caused plate 70 to slide forward has been removed, spring 56 will be effective to return the two pieces 50, 70 to their original position.

At the other end of base 50 is a second SPDT slide switch $S_2$, which is rigidly mounted in a way to provide for its arm 58 a movement direction which is perpendicular to the first slide switch. A recess or aperture 60 is provided in base 50 to accomodate one-half of coil spring 62. The spring 62 is provided in order to produce a restoring force when plate 70 is physically moved in a direction represented by arrow 78. This restoring force is accomplished by providing a recess or aperture 80 in line with and above recess 60, into which spring 62 fits. If the observer exerts a force against plate 70 in a direction parallel to arrow 78, the plate 70 will pivot about one of the two upright posts 51A, 51B, and spring 62 will be compressed in a manner similiar to that shown in FIG. 7. It will be noted that the recess 82 is narrow in the direction in which its associated arm 58 is activated, but wide in an orthogonal direction—so that a force which is applied for the purpose of activating switch $S_1$ will not be resisted by any interference with switch $S_2$. Similiarly, slot 72 has extra clearance on its sides so that plate 70 may be rotated about a fixed post 51A or 51B without interfering with switch $S_1$.

Figure 8:
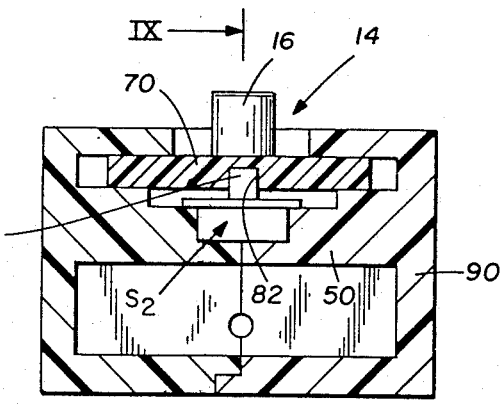
FIG. 8 is a cross-sectional elevation view of a control box, taken in the plane indicated by lines VIII—VIII in FIG. 9.
Figure 9:
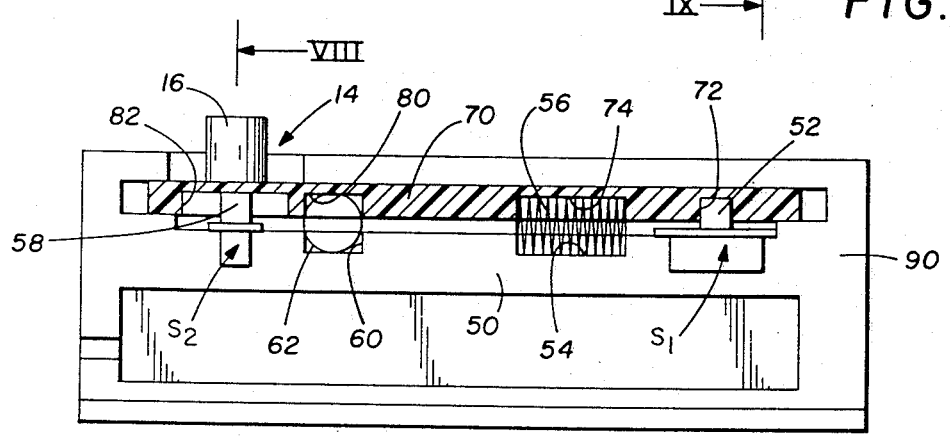
FIG. 9 is a cross-sectional elevation view of a control box, taken in the plane indicated by lines IX—IX in FIG. 8.

While FIG. 6 adequately shows how the principal parts of a control device are arranged, a commercial embodiment of the control box 14 will probably look more like that shown in FIGS. 8 and 9. A housing 90 (which is typically plastic) has an integrally molded ledge which provides a fixed base which is equivalent to the aforementioned base 50, and slide switches $S_1$ and $S_2$ can be seen mounted thereon. Rigidly attached to plate 70 is knob 16, so that the observer who holds the device in his hand can move the plate by exerting a force with a finger against the knob. Movement of the plate 70 in a direction parallel to its longitudinal axis, i.e., a direction parallel to arrow 76, will activate slide switch $S_1$; and movement along an orthogonal axis will activate slide switch $S_2$.

With particular reference to FIG. 9, it will be understood that coil spring 56 is mounted in a direction which is parallel to slide switch $S_1$. Coil spring 62 is mounted in a perpendicular direction, such that it is parallel to its associated slide switch $S_2$. The opposite sides of both coil springs extend partially into both the base 50 and the movable plate 70. One benefit obtained from this construction is that relative movement between the base 50 and the plate 70 in any direction parallel to the plate is resisted by either spring 56 or spring 62 or both. If desired, the springs may be preloaded (in compression) so that there is not free travel of the plate 70 before a restoring force is imposed on the plate. When the springs are pre-loaded, i.e., compressed during assembly of the box 90, there will be no slack in the system and the arms 52, 58 will always be initially centered along their excursion paths in the switches. Suitable electrical conductors (not shown in this figure) naturally connect the slide switches to respective ones of the display elements.

While the apparatus 14 shown in FIG. 9 is a preferred embodiment because of its simplicity, economy, and reliability, it should be understood that alternate means for transmitting signals to respective display elements are possible, including pneumatic means. Also, the signal-generating device could employ a series of push buttons above on/off switches, instead of a single knob 16 above two slide switches; and it could pass its signals to the indicator panel by use of a transmitter/receiver combination, in much the same way that a remote-control unit can convey signals to a television set or the like. Such portable transmitters are prone to be much more delicate than the device of FIG. 9, however, and thus they may have certain durability limitations. But they would eliminate the necessity for a plurality of wires extending between the unit 14 and the indicator panel 12. The existence of wire conductors between the signal-generating unit 14 and indicator panel 12 is not without its benefits, however, as will now be explained. When the driver of a vehicle cannot adequately determine the spatial relationship of his vehicle to its surroundings, instructions can be graphically displayed for the driver by an observer who need not be tied down to a specific position by the requirement to operate the vehicle. Thus, the observer can move to any advantageous spot where he feels he can see the vehicle and also see any possible obstacles. By moving the knob 16 on his control box, the observer may render an instruction to the driver concerning which way to steer the vehicle. If the vehicle is coupled to a trailer through a fifth wheel or a conventional trailer hitch, backing the vehicle in one direction will usually send the tail end of the trailer off in the opposite direction. To properly instruct the driver of a vehicle coupled to a trailer, it is necessary to reverse the scheme by which display elements concerned with steering are activated. This is conveniently accomplished with a set of auxilliary conductors 98 which are placed in series with the original conductors, as shown in FIG. 10. The connectors 96, 97 are naturally keyed so that conductor 36A is kept in electrical contact with conductor 36B; but the auxilliary conductors in series with conductors 38A, 37A are cross-wired, so that conductor 38A is placed in series with conductor 37B. Therefore, the observer need not worry about the problems introduced by the pivotal connection between the vehicle and trailer; he still moves the knob 16 to the right when he wants the trailer to be backed to the right. The driver, however, should see his left display arrow illuminated, so he turns his steering wheel to the left as he backs. The result is the subsequent inclination of the trailer in the correct direction.

It is perhaps appropriate here to emphasize that with this invention signals are communicated to the driver without the need for a spoken word. All that is necessary is that an observer see the vehicle, decide when corrections or changes need to be made, and then move the knob 16 in the same direction that the vehicle or trailer should be moved; the result will be an appropriate instruction displayed for the benefit of the driver. The observer can be mute or have a speech impediment, and still issue satisfactory commands to the driver; and, the driver can be deaf and still receive the commands; or, two persons who do not speak the same language can use the system, as can children who do not yet know left from right.

It is also worthy of note that the invention disclosed herein is particularly useful because it is a private communication system. Using this system, a driver need not be mentally stressed by trying to identify shouted instructions from his observer when there is appreciable background noise or there are other observers trying to render instructions to other drivers. For example, at a construction site where two or more trucks are attempting to back into a position where they could unload pre-mixed concrete at the same time, the noise of air compressors or the like need not interfere with safe backing of any truck.

While the driver will likely be more relaxed in knowing that he is responding to his own private instructions as he moves his vehicle, he may also be more comfortable—since the windows of his vehicle can be securely closed. Thus, the driver of an air-conditioned motor home can keep it cool, while the driver of a snow plow can keep his vehicle dry and warm, because only the observer need be exposed to the environment.

Another distinct advantage of the invention is its built-in safety feature that requires an observer to continuously over-ride a "stop" signal when the vehicle is to be moved. If the observer should become ill or lose consciousness or fall down behind a backing vehicle, the box 14 will be left unattended, and the spring-biased knob will return to its "rest" position in the center of its excursion area. This centering of the knob 16 will terminate either the pulses through line 20 or the steady signal line 24, causing the driver to again see a steady light behind lens $L_3$—which is his signal to stop. Too, if some malfunction should occur within control box 14 or the electrical conductors, the stop signal will again be manifested on the unit 12. This is because all of the biasing components that turn light $B_3$ to its ON condition are contained completely within the vehicle. In other words, any lack of capacity in unit 14 to generate a signal, or any break in an electrical wire, cannot cause an erroneous "move" signal to be displayed by lens $L_3$.

While only the preferred embodiments of the invention have been disclosed in great detail herein, it will be apparant to those skilled in the art that modifications thereof can be made without departing from the spirit of the invention. Thus, the specific structure shown herein is intended to be exemplary and is not meant to be limiting, except as described in the claims appended hereto.

What is claimed is:

1. Apparatus for conveying guidance and movement instructions to the driver of a vehicle when he cannot adequately determine the spatial relationship of his vehicle to its surroundings, when such instructions can be issued by an observer who is at an advantageous position remote from the vehicle driver, comprising:
    a. an indicator panel adapted to be positioned on the vehicle adjacent the driver's station where it may be observed by the driver, said panel having at least three selectively operable display elements, with two of said display elements being adapted to provide right and left steering instructions, and a third display element being adapted to provide movement instructions including stop, move forward, and back up;
    b. a signal-generating device adapted to be carried by the observer, said device including means for generating steering and movement signals, and said device including a single control handle which is movable by the observer from a centered position to any selected one of serveral signal-generating positions, with said device being self-canceling such that a display element will convey certain instructions to the driver for only as long as the control handle is manually held against a biasing element in a non-centered position; and c. means for transmitting continuous signals from the signal-generating device to respective display elements, for as long as the control handle is in a signal-generating position.

2. The apparatus as claimed in claim 1 wherein the display elements include electric bulbs, and the means for transmitting signals comprises four electrical conductors extending between the signal-generating device and respective ones of the electric bulbs and a battery.

3. The apparatus as claimed in claim 2 and further including an auxiliary set of electrical conductors for connection in series with the original conductors between the display elements and the signal-generating device, and those auxilliary conductors which are in series with the steering instruction bulbs being crossed with respect to the original conductors, whereby the signal-generating device illuminates different bulbs when the auxiliary conductors are used as compared with the bulbs which are illuminated with the original conductors.

4. The apparatus as claimed in claim 1 wherein the signal-generating device has means for generating steer right, steer left, stop, move forward, and move backward signals, and also combinations of steer left and move forward signals, steer left and move backward signals, steer right and move forward signals, and steer right and move backward signals.

5. The apparatus as claimed in claim 1 wherein the signal-generating device has a control handle with a centered rest position and eight alternate positions, with the alternate positions being located in radial directions from the rest position along axes separated by 45°.

6. The apparatus as claimed in claim 5 wherein an affirmative signal is displayed for the driver on the indicator panel when the signal-generating device is energized and the control arm is in its rest position, which affirmative signal may be designated as a stop instruction or do not move instruction to the driver.

7. The apparatus as claimed in claim 1 wherein said signal-generating device includes a control handle coupled to an electrical switch, and the handle being movable in a plane from a centered position to a right, left, front or rear position, or combinations thereof, and said switch being spring-biased to return to its centered position in the absence of an external force against same.

8. The apparatus as claimed in claim 7 wherein the switch includes two switching elements, with each element constituting a SPDT slide-type switch, and further including spring means associated with each of said switching elements to bias them to a centered position.

9. The apparatus as claimed in claim 8 wherein the spring means associated with each switching element constitutes a single spring positioned to oppose movement of its associated switching element from a centered position to either of its contact positions.

10. The method of visually rendering movement instructions such as stop, move forward and move backward to the driver of a vehicle in a safe manner, said instructions being issued by an observer who is at a position remote from the driver, and said instructions being displayed with use of an electrically powered display element such as an electric bulb which is visible to the driver.

a. establishing a first signal in the display element to bias it to its ON condition for indicating to the driver that he should stop, and when stopped that he should not move, and said bias signal being established with electrically powered equipment contained completely within the vehicle;

b. rendering a first instruction to the driver when appropriate that he should move the vehicle in a particular direction, said instruction being rendered by sending a second and steady signal to temporarily override the bias signal and put the display element in its OFF condition; and c. selectively rendering a different movement instruction to the driver when appropriate, said instruction being rendered by sending a third signal to the display element, and said third signal consisting of a series of pulses which are effective to intermittently turn the display element OFF, whereby a blinking effect is achieved with the display element.

11. The method of rendering movement instructions as claimed in claim 10 wherein the display element is biased to its ON condition by virtue of an electric circuit operated off the vehicle's battery, with said electric circuit including a transistor, and wherein movement instructions are rendered by selectively opening the electric circuit by switching the transistor OFF.

12. Apparatus for conveying guidance and movement instructions to the driver of a vehicle from a remote observer, comprising:

a. an indicator panel adapted to be positioned on the vehicle adjacent the driver's station, said panel having at least three selectively operable display elements, with two of said display elements being adapted to provide right and left steering instructions, and the third display element being adapted to provide movement instructions, and the third display element being biased to be ON as its rest condition when it is installed in a vehicle;

b. a signal-generating device adapted to be carried by the observer, said device including means for generating steer right, steer left, move forward, and move backward signals, and also combinations, of steering and movement signals, with said means including a fixed base, and a first slide switch characterized as a SPDT switch which is mounted at one end of said base, and a second SPDT slide switch mounted at the other end of the base, and the second switch being mounted in a direction which is perpendicular to the first switch and both of slide switches having projecting arms by which the switches are activated, and said means further including a movable plate juxtaposed over said base, said plate having two spaced recesses into which are fitted the projecting arms of the two slide switches, whereby movement of the plate along one axis will activate one of the slide switches and movement along an orthogonal axis will activate the other slide switch, and further including spring means for biasing the movable plate to a rest position at which the activating arms are centered along their respective excursion paths, and knob means by which a force may be selectively applied to the movable plate to slide the same with respect to the base so as to activate either of the slide switches; and c. means for transmitting signals from the signal-generating device to respective display elements, said means including an electrical conductor extending from each terminal of one slide switch to respective ones of the two display elements which are adapted to provide steering instructions, and further including an electrical conductor extending from each terminal of the other slide switch to the display element which provides movement instructions, with one of the last-named conductors having a blinker therein, whereby a steady and pulsed display may be achieved with said element.

* * * * *